W. S. CARR.

Assignor to C. M. Keeler & C. F. Blake.

WATER-CLOSET.

No. 7,626. Reissued April 24, 1877.

Witnesses.

Chas. H. Smith

Geo. T. Pinckney

Inventor

William S. Carr.

per Samuel W. Serell atty.

N. PETERS, PHOTO-LITHOGRAPHER, WASHINGTON, D. C.

UNITED STATES PATENT OFFICE.

WILLIAM S. CARR, OF NEW YORK, N. Y., ASSIGNOR TO CHARLES M. KELLER AND CHARLES F. BLAKE, TRUSTEES; SAID CHARLES F. BLAKE BEING SURVIVING TRUSTEE.

IMPROVEMENT IN WATER-CLOSETS.

Specification forming part of Letters Patent No. 80,708, dated August 4, 1868; reissue No. 5,866, dated May 12, 1874; reissue No. 7,626, dated April 24, 1877; application filed January 10, 1877.

*To all whom it may concern:*

Be it known that I, WILLIAM S. CARR, of the city and State of New York, have invented Improvements in Water-Closets, of which the following is a specification:

In the construction of pan water-closets, it has heretofore been customary to form the metallic receiver or container (that part of the closet which contains the pan) with flaring sides, provided at top with an outwardly-projecting flange, upon which the top plate of the receiver is bolted. This top plate is a ring of less internal diameter than either the earthenware basin or the pan, and upon it the basin rests.

This construction has heretofore been deemed necessary in order to provide for the insertion of the pan in the receiver, the pan being of greater diameter than the bottom of the basin, and of greater diameter than the orifice or circular hole in the top plate.

This plan involved the use of two castings, of bolts and nuts, and was objectionable for several reasons: First, it was necessary to make a putty joint between the receiver and the top plate. This joint often leaks gas. Second, this joint must be broken and remade, and all the bolts must be removed whenever it is necessary to repair an old pan or replace it by a new one, and as the nuts and screws become rusty, the closet is often damaged; moreover, the operation takes time, and consequently is expensive.

My invention obviates these difficulties, and at the same time furnishes a cheaper closet.

My invention relates to a water-closet with a top plate of such form that it will at the same time support the basin, as usual, and also admit of the introduction and removal through it of a pan of the usual proportions in relation to those of the basin and receiver.

Receivers have been made with a joint adjacent to the axis of the pan to allow of said axis being inserted before the parts are bolted together. I make use of a receiver that does not have any joint at this point; thereby risk of gas escaping is lessened; and one portion of my invention consists in combining, with such receiver, a pan inserted through an opening in the top plate, and an axis that is introduced wholly or partially from outside through a hole in such receiver, after which the pan and axis are secured together.

Figure 1:
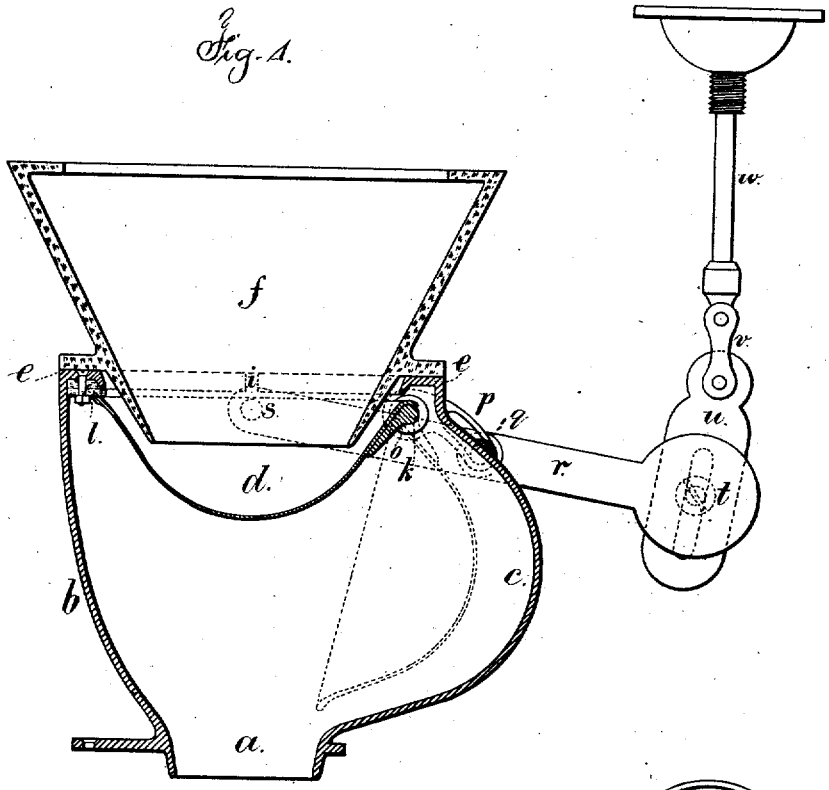
Figure 2:
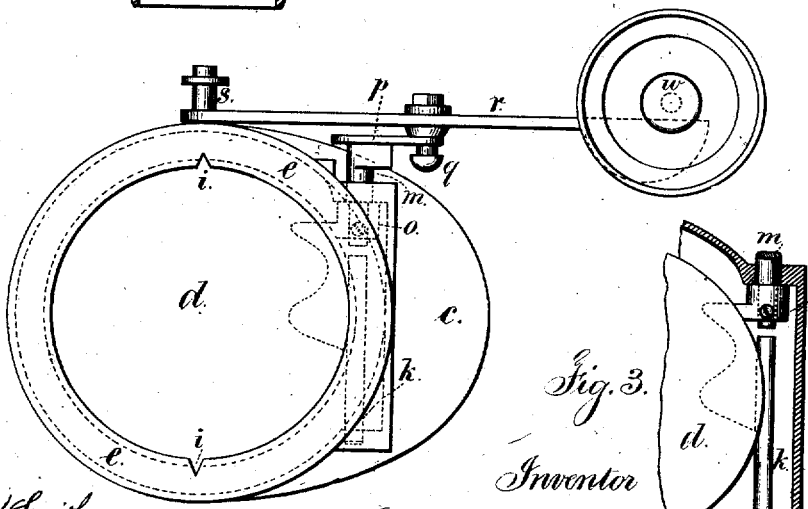
Figure 3:
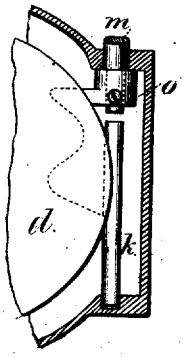

In the drawings, Figure 1 is a vertical section through a water-closet. Fig. 2 is a plan or top view of the same, with the earthenware basin removed. Fig. 3 is a partial horizontal section.

In these drawings, the receiver is represented at *a a b c*, the top plate at *e e*, and the basin at *f*. The pan is shown at *d*.

In these drawings the top plate is shown as cast in one piece with the receiver, and the latter as of a peculiar form, such peculiarity not being essential to the working of the invention herein claimed.

The top plate is also shown of peculiar form, as far as the shape of its inner edge is concerned, it being nicked or cut away, so that the pan when held edgewise may be passed through the top plate, but of such shape and relative proportion that the edges of the pan when horizontal or nearly so will extend outside of the aperture in the top plate, except at those portions where it is cut away.

I prefer to make these nicks, indentations, or depressions *i i* in the general contour of the interior edge of the top plate as small as possible, as long as they will permit of the introduction and removal of the pan when turned edgewise.

It is obvious that this form of the inner edge of the top plate admits of the introduction and removal of the pan without removal of the top plate, and when the top plate is so shaped and cast or formed in one piece with the receiver, it still permits the necessary repairs. The joint need never be disturbed. In the latter case it need never be made, and both joint and bolts are saved.

The ordinary leather cushion, preventing concussion of the pan, is shown at *l*. The ordinary pan-arm is shown at *p*, slotted as usual, and the ordinary pan-lever is represented at *r*.

I prefer to make the pan-axis in two pieces, the one, *k*, secured to the pan, and resting in a recess formed in the inside of the receiver. The other piece, *m*, passes through a hole in the receiver, and enters a sleeve, *o*, secured to the pan. After the piece *m* has been inserted, it is secured to the sleeve by a screw.

Another novelty in the closet shown in the drawings is the introduction of the slotted link *u*, between the pan-lever and the ordinary link *v* and pull *w*. This link is secured to the end of the lever *r* by a screw, *t*, passing through the slot, and by moving the slot over the screw the parts can be adjusted to different heights of seat, while by swinging the link *u* on the pin an adjustment can be made for different positions of the pull-knob in the seat.

I claim—

1. A water-closet receiver, adapted to support the basin, and having a flange or top plate with an opening, a portion of which is of less diameter than the pan, and another portion is of larger diameter than the pan, in combination with the removable pan that may be inserted or withdrawn through said opening, substantially as set forth.

2. A water-closet made with a receiver having a top plate or flange with an opening, shaped substantially as set forth, for passing the pan, in combination with such pan, and a separate axis inserted from outside through a hole in the receiver, and connected to such pan, substantially as set forth.

3. In combination with a water-closet pan, a divided axis, constructed substantially as set forth.

4. A slotted link, *u*, interposed between and acting in combination with the pull and the pan-lever, substantially as described.

Signed by me this 13th day of November, A. D. 1876.

WM. S. CARR.

Witnesses:
GEO. D. WALKER,
CHAS. H. SMITH.